O. H. TITUS.
SMOKE PURIFYING ATTACHMENT FOR FUEL BURNING HEATERS.
APPLICATION FILED MAR. 29, 1919.
1,392,093.
Patented Sept. 27, 1921.
2 SHEETS—SHEET 1.
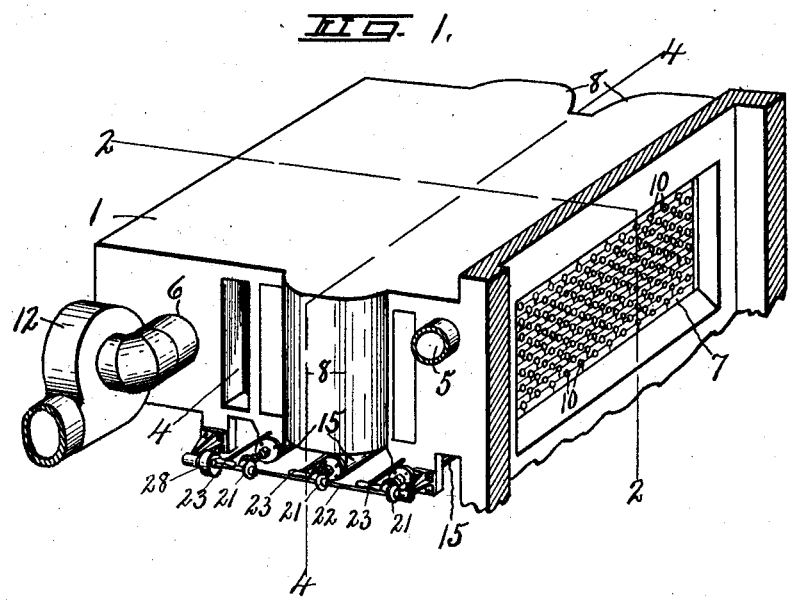
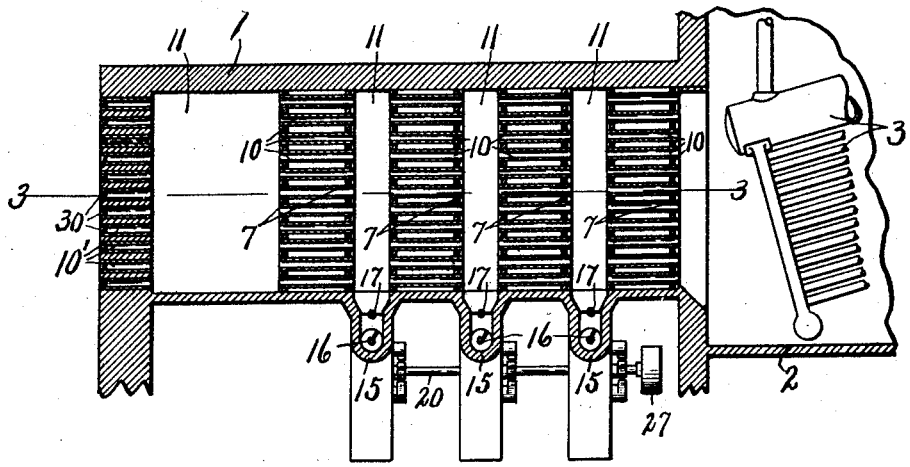
INVENTOR
O.H. Titus
BY Howard P. Denison
ATTORNEY.

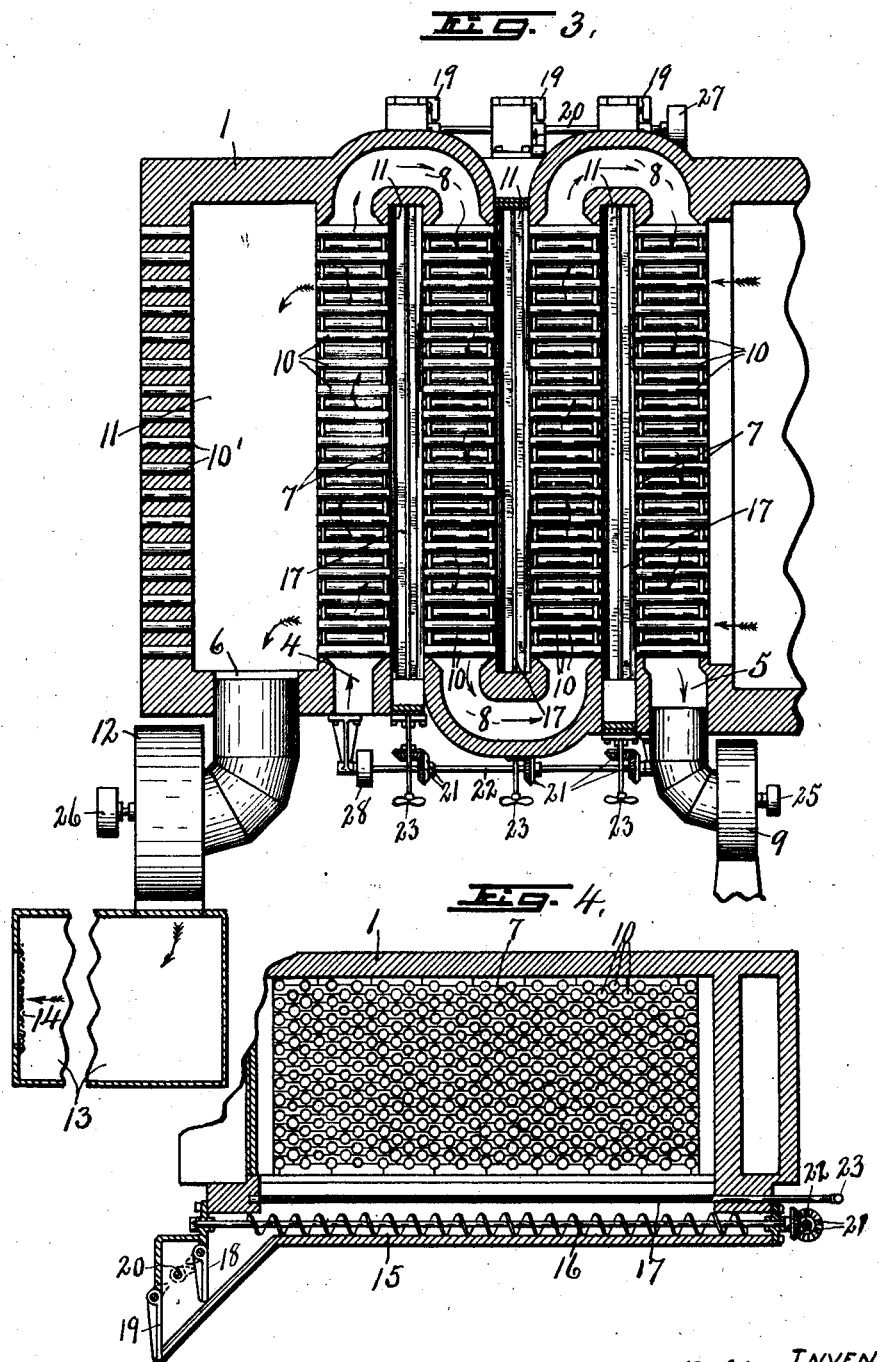

UNITED STATES PATENT OFFICE.

ODEON H. TITUS, OF JAMESVILLE, NEW YORK.

SMOKE-PURIFYING ATTACHMENT FOR FUEL-BURNING HEATERS.

1,392,093.

Specification of Letters Patent.   Patented Sept. 27, 1921.

Application filed March 29, 1919.   Serial No. 286,206.

*To all whom it may concern:*

Be it known that I, ODEON H. TITUS, a citizen of the United States of America, and resident of Jamesville, in the county of Onondaga, in the State of New York, have invented new and useful Improvements in Smoke-Purifying Attachments for Fuel-Burning Heaters, of which the following, taken in connection with the accompanying drawings, is a full, clear, and exact description.

This invention relates to an attachment for heaters and other fuel burners from which more or less valuable solids are delivered with the products of combustion, and the main object of my present invention is to provide a simple and efficient means whereby these solid by-products may be automatically and expeditiously separated and recovered from the gaseous products, and at the same time to utilize the products of combustion for heating a circulating current of air to be used in kilns and in other relations where heated air might be useful for drying, heating or desiccating purposes.

One of the specific objects is to cause the products of combustion to pass successively through a plurality of series of relatively small passages or tubes and expansion chambers, whereby the speed of delivery is sequentially accelerated and retarded in transit through the attachment for the purpose of automatically separating the major portion of the solids from the gases.

Another object is to provide means for recovering the lighter solids which may be conveyed by the escaping gases.

A further object is to extend the tubes of the several series across a corresponding number of air conduits connected in series and provided with an inlet and an outlet at opposite ends of the series, whereby atmospheric air may be freely circulated through the conduits and simultaneously heated in transit by the tubes.

Other objects and uses relating to specific parts of the attachment will be brought out in the following description.

In the drawings:—

Figure 1 is a perspective view of the detached separator and air heater, the end thereof adjacent the fuel burner or heater being shown in section.

Fig. 2 is a vertical sectional view taken on line 2—2 Fig. 1, showing a portion of a boiler and housing therefor.

Fig. 3 is a horizontal sectional view of the apparatus shown in Fig. 1, showing, in addition thereto, a suction pump for forcibly circulating the air through the air conduits.

Fig. 4 is a longitudinal vertical sectional view taken on line 4—4 Fig. 1.

As illustrated, this attachment comprises a fire proof casing —1— having one end open and adapted to be secured to or built integrally with a housing —2— for a boiler —3— or other fuel burner, thereby establishing open communication between casing —1— and housing —2— through which the products of combustion may pass, the remaining portions of the casing being closed except that it is provided with an air inlet —4—, an air outlet —5—, and an additional outlet —6— for the lighter heated products of combustion which may escape therethrough.

The interior of the casing between its open end and the opposite end is divided by a series of, in this instance four, hollow partitions —7— extending from top to bottom and from side to side of the casing —1— in parallel spaced relation to form a corresponding number of air conduits which are connected in series by passages —8—, thereby establishing a continuous air passage, one end of which is connected to the inlet —4—, and the other end to the outlet —5—, as shown more clearly in Fig. 3.

The inlet —4— preferably opens directly to the atmosphere, while the outlet —5— is connected to a suction pump or blower —9— by which the air is forcibly circulated through to the conduits —7—.

The casing —1— is substantially rectangular and the opening in the end thereof adjacent the heater housing —2— is of the same or slightly greater area than the cross sectional area of the interior of the casing, and therefore the products of combustion entering the open end of the casing impinge against the entire area of the adjacent conduits —7—.

Each of the partitions —7— is adapted to receive and support a multiplicity of relatively small tubes —10— extending transversely therethrough across the intervening air space in parallel uniformly spaced relation throughout the greater portion of the area of said partitions for conducting the heated products of combustion therethrough, and through the several partitions in sequence, and also serving to heat the air in transit through said partitions.

The end wall of the casing —1— opposite that which is connected to the heater housing —2— is normally closed and spaced apart from the adjacent hollow partition —7— to form an intervening space which together with the spaces between the several partitions —7— constitute what may be termed collecting chambers —11— for the reception of the heavier or solid products of combustion which may be precipitated therein from the lighter gases.

It is now evident that the heated products of combustion entering the open side of the casing —1— are successively contracted into relatively small jets in the tubes —10— and expanded in the chambers —11— thereby sequentially accelerating and retarding the flow of said products through the tubes and chambers respectively.

The expansion of the products in the chambers —11—, particularly those between the hollow partitions —7— serve to permit the deposit of the solids at the bottoms thereof, while the lighter gases escape to the larger chamber —11— at the rear end of the casing, from which latter chamber they may be forcibly withdrawn by means of a suction pump or blower —12— and delivered to a final separating chamber —13— having a screened outlet —14— by which the gases are allowed to escape while the residue solids will be collected in the chamber —13—.

The major portion of the solids are, however, automatically collected by precipitation in the expansion chambers —11— between the hollow partitions —7—, and may be recovered therefrom in any suitable manner.

For this purpose, the bottom of each chamber —11— between the partitions —7— is extended downwardly some distance below the system of tubes —10— to form a lengthwise conduit —15— for receiving a conveyer screw —16— or equivalent feeding device, and a superposed chamber or movable bottom plate —17—, the latter being normally closed to support the solids which may collect thereon, and when required may be opened to allow said solids to be deposited in the conduit —15— and removed therefrom by the conveyer —16—.

In order that the solids may be removed by the conveyers —16— while the apparatus is in continuous operation without reducing its efficiency, the discharge end of the conduit —15— is provided with a pair of self-closing gates —18— and —19— adapted to be successively opened by a revolving camshaft —20—, the cams of which are arranged to open the gates —18— and allow them to close in advance of the opening of the gates —19—, thereby keeping the chambers closed at all times except through the inlet and outlet for the products of combustion.

The conveyers may be operated simultaneously, and for this purpose their shafts are connected by gears —21— to a driving shaft —22— running across the outer ends of the conduits —15— opposite the discharge ends thereof as shown more clearly in Fig. 1 and 3.

The dampers —17— may be operated individually at will, and for this purpose are provided with handles —23— at the exterior of the casing.

The pumps —9— and —12— and shafts —20— and —22— are provided respectively with pulleys —25—, —26—, —27— and —28— adapted to be driven by special motors (not shown) or may be driven from the same source of power by connecting them in any well known manner, not necessary to herein illustrate or describe.

The tubes —10— of the several partitions —7— are preferably alined with each other to facilitate cleaning, the rear wall of the casing being provided with openings or similar tubes —10'— through which the cleaner may be inserted from the exterior of the casing through the corresponding tubes —10— of the several series, but at other times the tubes —10'— are closed by plugs —30— as a further means for keeping the casing substantially gas tight with the exceptions previously pointed out.

The operation briefly described is as follows:

The products of combustion passing through the tubes —10— of the first partition —7— expand into the first chamber —11— where some of the solids are deposited by precipitation owing to the temporarily retarded movement of said products by expansion, the remaining products then continuing successively through the tubes —10— of the remaining partitions and intervening spaces where similar and further deposits are made, until the lighter gases with some residue solids pass into the larger chamber —11— from which they are withdrawn by the pump —12— and forced into the chamber —13— for final separation of the residue solids from the gases, the latter escaping to the atmosphere or to any other place desired.

During this transit of the heated products of combustion through the several systems of tubes —10— and intervening chambers —11—, the tubes become highly heated and this heat is transmitted to or absorbed by the air which is forcibly circulated through the hollow partitions —7— and connecting passages —8— by means of the pump —9— from which the heated air may be delivered to a kiln or other drying or desiccating room where the heated air may be of service.

When it is desired to remove the solids from the several chambers —11— between the partitions —7—, the dampers —23— may be opened by hand and the conveyers —16— then set in motion to feed the solids to the discharge end of the conduit —15— where they may be collected for use. The circulation of air around the tubes —10— has a greater or less cooling effect upon the heated products passing through said tubes and serves to accelerate the precipitation of the solids to the bottom of the collecting chamber by reasons of the increased specific gravity of said products incidental to the aborption of heat therefrom.

What I claim is:

1. In a smoke purifying apparatus, the combination with a fuel burning heater having an outlet for the products of combustion, of a horizontally extending casing communicating at one end with said outlet, and a plurality of hollow partitions extending across the interior of the casing in parallel spaced relation lengthwise of the casing to form intervening collecting chambers for solid products of combustion, each hollow partition having a series of relatively small tubes extending therethrough lengthwise of the casing for conducting the products of combustion from the outlet of the heater to the several collecting chambers in sequence.

2. In a smoke purifying apparatus, the combination with a fuel-burning heater having an outlet for the products of combustion, of a horizontally extending casing communicating at one end with said outlet, a plurality of hollow partitions extending across the interior of the casing in parallel spaced relation lengthwise of the casing to form intervening collecting chambers for solid products of combustion, each hollow partition having a series of relatively small tubes extending therethrough lengthwise of the casing for conducting the products of combustion from the outlet of the heater to the several collecting chambers in sequence, and means for circulating air through the hollow partitions to absorb heat from said products in transit through the tubes and thereby to accelerate precipitation of the solids to the collecting chamber.

3. In a smoke purifying apparatus the combination with a fuel-burning heater having an outlet for the products of combustion, of a horizontally extending casing communicating at one end with said outlet, a plurality of hollow partitions extending across the interior of the casing in parallel spaced relation lengthwise of the casing to form intervening collecting chambers for solid products of combustion, each hollow partition having a series of relatively small tubes extending therethrough lengthwise of the casing for conducting the products of combustion from the outlet of the heater to the several collecting chambers in sequence, and a suction pump connected to the last one of the several collecting chambers for drawing the lighter products of combustion through the tubes of the several series.

4. In a smoke purifying apparatus, the combination with a fuel-burning heater having an outlet for the products of combustion, of a horizontally extending casing communicating at one end with said outlet, and a plurality of hollow partitions extending across the interior of the casing in parallel spaced relation lengthwise of the casing to form intervening collecting chambers for solid products of combustion, each hollow partition having a series of relatively small tubes extending therethrough lengthwise of the casing for conducting the products of combustion from the outlet of the heater to the several collecting chambers in sequence, a separating chamber external to the casing and provided with a screened outlet, and means for withdrawing the lighter products of combustion from the last one of the several collecting chambers of the casing and delivering said lighter products into the separating chamber.

5. In a smoke purifying apparatus, the combination with a fuel-burning heater having an outlet for the products of combustion, of a casing having an inlet in one end and an outlet in its opposite end in substantially the same horizontal plane as the inlet, said inlet communicating with the outlet of the heater for receiving the products of combustion, a plurality of upright hollow partitions extending across the interior of the casing in parallel spaced relation between the inlet and outlet to form intervening collecting chambers, said partitions having horizontally extending air passages therethrough from side to side connected in series, each of said partitions having a series of relatively small tubes extending therethrough in parallel spaced relation transversely of said air passages, for conducting the products of combustion from the inlet to the several collecting chambers and to the outlet, and means for circulating air through the air passages and around said tubes.

6. In a smoke purifying apparatus, the combustion with a fuel-burning heater having an outlet for the products of combustion, of a casing having a hollow upright partition across the interior thereof forming an air passage extending horizontally therethrough from side to side, and a series of relatively small tubes extending horizontally through the hollow partition and across the air passage therein in parallel spaced relation, said casing having an inlet at one end of the tubes communicating with the outlet, and a collecting chamber at the opposite ends of the tubes for receiving the products of combustion passing from the inlet to said tubes.

7. In a smoke purifying apparatus, the combination with a fuel-burning heater having an outlet for the products of combustion, of a casing having a hollow upright partition across the interior thereof forming an air passage extending horizontally therethrough from side to side, and a series of relatively small tubes extending horizontally through the hollow partition and across the air passage therein in parallel spaced relation, said casing having an inlet at one end of the tubes communicating with the outlet, a collecting chamber at the opposite end of the tubes for receiving the products of combustion passing from the inlet to said tubes, and means for circulating air through said air passage.

8. In a smoke purifying apparatus, the combination with a fuel-burning heater having an outlet for the products of combustion, of a casing having a hollow upright partition across the interior thereof forming an air passage extending horizontally therethrough from side to side, a series of relatively small tubes extending horizontally through the hollow partition and across the air passage therein in parallel spaced relation, said casing having an inlet at one end of the tubes communicating with the outlet, a collecting chamber at the opposite ends of the tubes for receiving the products of combustion passing from the inlet to said tubes, said collecting chamber being extended downwardly some distance below the horizontal plane of the lower-most tubes for receiving the heavier products of combustion which may be precipitated therein, and means movable in said extension for removing the collected products of combustion from said extension.

9. In a smoke purifying apparatus, the combination with a fuel-burning heater having an outlet for the products of combustion, of a casing having a hollow upright partition across the interior thereof forming an air passage extending horizontally therethrough from side to side, a series of relatively small tubes extending horizontally through the hollow partition and across the air passage therein in parallel spaced relation, said casing having an inlet at one end of the tubes communicating with the outlet, and a collecting chamber at the opposite ends of the tubes for receiving the products of combustion passing from the inlet to said tubes, said collecting chamber being extended downwardly some distance below the horizontal plane of the lower-most tubes, a conveyer movable in close proximity to the bottom of the extension for removing the solids therefrom, and means for opening and closing communication between the lower portion of the extension and upper portion of the collecting chamber.

10. In a smoke purifying apparatus, the combination with a fuel-burning heater having an outlet for products of combustion, of a casing having an inlet at one end communicating with the outlet of the heater for receiving the heated products of combustion therefrom, said casing having a series of hollow partitions and collecting chambers alternating with each other in sequence from the inlet in the same horizontal plane, said hollow partition being connected in series to form a continuous air conduit traversing the interior of the casing, each hollow partition having a series of relatively small tubes extending horizontally therethrough in parallel spaced relation lengthwise of the casing for connecting the inlet with the first compartment, and also connecting the several compartments whereby the products of combustion may pass sequentially through the several hollow partitions and compartments and allow the solid products of combustion to collect sequentially by gravitation on the bottom of each compartment.

In witness whereof I have hereunto set my hand this 26th day of March, 1919.

ODEON H. TITUS.

Witnesses:
H. E. Chase,
A. G. Jordan.